Figure 3:
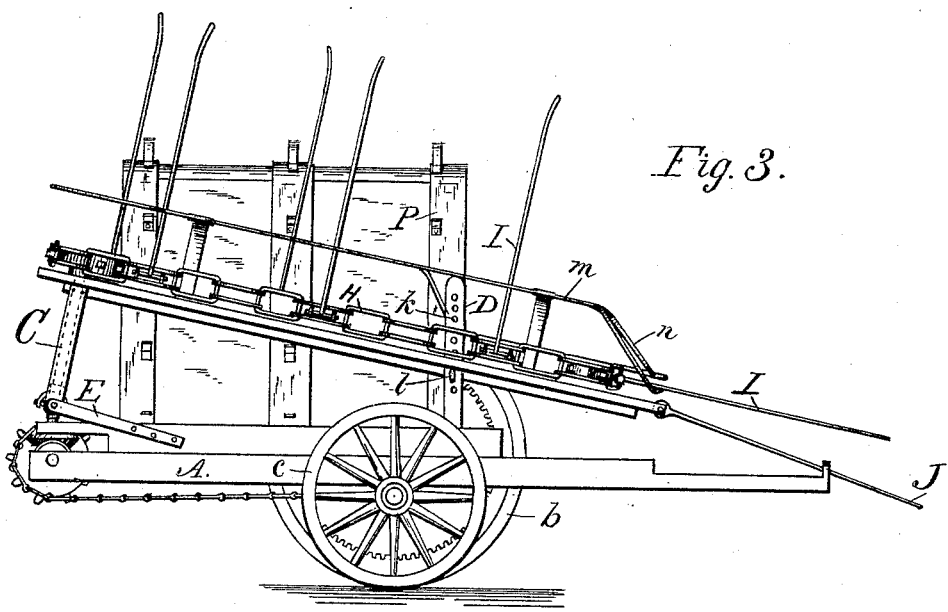

(No Model.) 2 Sheets—Sheet 1.
G. G. F. BOSWELL.
STALK HARVESTER.
No. 327,649. Patented Oct. 6, 1885.
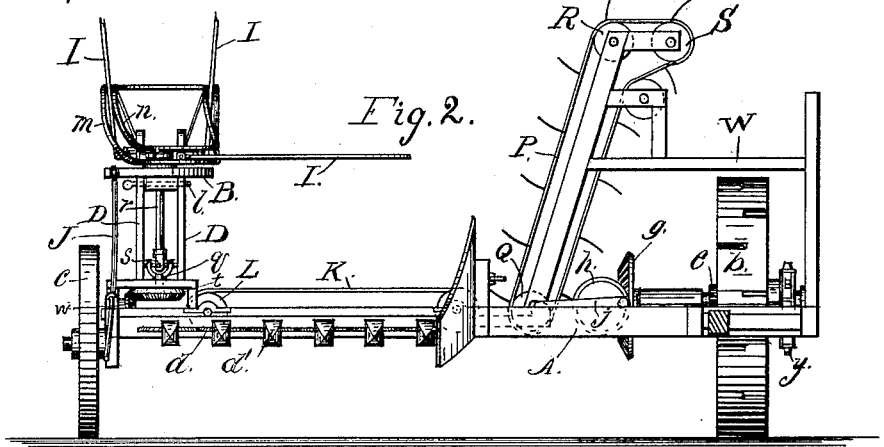
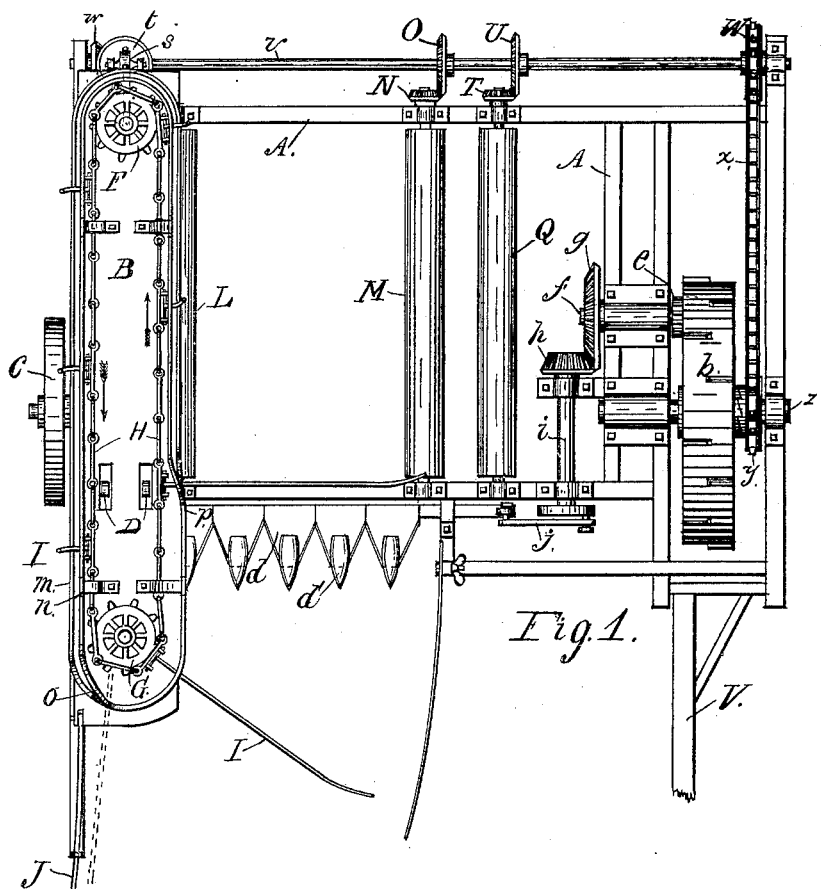
Witnesses:
G. Pood.
A. M. Hood.
Inventor:
George G. F. Boswell
By H. P. Hood
Atty.

(No Model.) 2 Sheets—Sheet 2.
G. G. F. BOSWELL.
STALK HARVESTER.

No. 327,649. Patented Oct. 6, 1885.

WITNESSES:
M Carsten
A. M. Hood.

INVENTOR:
George G. F. Boswell
By H. P. Hood
Atty.

UNITED STATES PATENT OFFICE.

GEORGE G. F. BOSWELL, OF INDIANAPOLIS, INDIANA.

STALK-HARVESTER.

SPECIFICATION forming part of Letters Patent No. 327,649, dated October 6, 1885.

Application filed July 5, 1884. Serial No. 136,824. (No model.)

*To all whom it may concern:*

Be it known that I, GEORGE G. F. BOSWELL, a citizen of the United States, residing at Indianapolis, in the county of Marion and State of Indiana, have invented a new and useful Improved Stalk-Harvester, of which the following is a specification.

My invention relates to an improvement in machines for harvesting corn and other like stalks.

The object of my improvement is to gather the stalks toward the cutting mechanism and present them thereto in an effective and practical manner.

The accompanying drawings illustrate my invention.

Figure 1 is a plan with the elevator-belts removed. Fig. 2 is a front elevation. Fig. 3 is a side elevation.

A is the main frame having carrying-wheels $b$ and $c$. Wheel $b$ is also a driving-wheel having internal cog-teeth, by means of which a reciprocating motion is given to the cutter-bar $d$, moving in the finger-bar $d'$, which is fastened to frame A, through pinion $e$, shaft $f$, bevel-gears $g$ and $h$, shaft $i$, and pitman $j$, in a manner common and well-known in reaping-machines.

B is a light frame or table supported upon and afore the grain side of frame A by standards C C and D D. Standards C are rigidly secured at their upper ends to the under side of table B, and are hinged at their lower ends to a bracket, E, bolted to frame A. Standards D are rigidly secured to frame A, projecting upward therefrom, and each having a series of holes, $k$. They form, together with a bolt, $l$, passed through said holes, an adjustable support for the forward end of table B.

On the upper side of table B are mounted a pair of sprocket-wheels, F and G, over which passes a chain-belt, H.

Hinged to belt H, at intervals, are a series of arms I. Said arms are slightly curved toward their outer ends, and are for the purpose of gathering the standing stalks, raising them when fallen, and drawing them toward the cutters as the machine moves forward.

$m$ $n$ are guides for controlling the movement and position of arms I. Said guides are rods mounted on and above table B in such a position as to allow arms I to pass between them, and to hold said arms upright between them, except near the forward end of said table, at which point the guides are bent downward at $o$, and from that point to a point, $p$, a little back of the cutters, they operate to hold said arms outward in a plane parallel to the upper surface of the table.

J is a gathering-rod hinged to the forward end of table B, and adapted to pass along the outside of the row of stalks and assist in raising them, if fallen, and guiding them within the reach of arms I.

Belt H is driven in the direction indicated by arrows by means of vertical shafts $q$ and $r$, united by a universal joint-coupling, $s$, and connected by the bevel-gears $t$ and $w$, shaft $v$, sprocket-wheel W, chain-belt $x$, and sprocket-wheel $y$ with the driving-wheel $b$. The sprocket-wheel $y$ is loosely mounted on the main axle $z$ and connected with the hub of wheel $b$ by means of a clutch or other similar device, so as to move with said wheel or not, at the pleasure of the operator.

K is a conveyer-belt mounted on rollers L and M, one of which is driven by a pair of bevel-wheels N O.

P is an elevator-belt mounted on rollers Q R S, and driven by a pair of bevel gear-wheels, T U.

The operation of my machine is as follows: The forward end of the table B is adjusted vertically on standards D to suit the condition of the stalks, and there secured by means of bolt $l$. If the stalks are standing upright in good shape the forward end of the table is set so that the table is nearly or quite level; but if the stalks are considerably inclined from the perpendicular the end of the table is lowered till the ends of arms I, when extended in front of and parallel with the table, are near the ground. As the machine is drawn forward by draft-pole V, chain-belt H is driven as before explained, and arms I falling in succession outside the row of stalks, their curved outer ends pass under the fallen stalks, if there are any, and such stalks are raised as they approach the cutters, so that, with those originally upright, they are presented to the scythe in a favorable position for cutting. After the stalks are severed they are carried backward onto belt by arms I, which are then raised clear of the stalks to an upright position by the guides *m n*. Belt K conveys the stalks to belt P, by which they are raised and deposited on a table, W.

I claim as my invention—

1. In a stalk-harvester, the combination of the main frame mounted on carrying-wheels, cutting-knives mounted on said frame and operated by one of said carrying-wheels and intermediate connecting mechanism, a conveyer-belt mounted on said main frame, a belt having gathering-arms hinged thereto, as shown and described, and mounted on a table, one end of which is vertically adjustable in relation to said main frame, means for driving said belt, and guides for controlling the position of said gathering-arms, all combined and arranged to co-operate substantially as and for the purpose specified.

2. In a stalk-harvester, a chain-belt mounted on a pair of sprocket-wheels, a table, one end of which is vertically adjustable, gathering-arms hinged to said chain so as to swing outward therefrom, as shown and described, guides for controlling the position of said arms, and means for driving said sprocket-wheels and belt in different positions, all combined substantially as and for the purpose specified.

3. In a stalk-harvester, the combination, with main frame A, carrying-wheels $b$ and $c$, cutters $d$, and the intermediate mechanism connecting wheel $b$ and scythe $d$, of table B, mounted on said main frame and vertically adjustable in relation thereto, chain-belt H, arms I, guides $m\ n$, sprocket-wheels F and G, shaft $q$, coupling $s$, shaft $r$, and intermediate mechanism connecting driving-wheel $b$ with shaft $r$, all substantially as and for the purpose specified.

GEO. G. F. BOSWELL.

Witnesses:
H. P. HOOD,
A. M. HOOD.